(12) United States Patent
Blaser et al.

(10) Patent No.: US 11,773,969 B2
(45) Date of Patent: Oct. 3, 2023

(54) OPERATION OF A MULTI-SPEED VEHICLE TRANSMISSION

(71) Applicant: ZF Friedrichshafen AG, Friedrichshafen (DE)

(72) Inventors: Jürgen Blaser, Meckenbeuren (DE); Fabian Ley, Friedrichshafen (DE); Jens Winter, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/573,021

(22) Filed: Jan. 11, 2022

(65) Prior Publication Data
US 2022/0221051 A1 Jul. 14, 2022

(30) Foreign Application Priority Data

Jan. 11, 2021 (DE) ...................... 10 2021 200 165.3

(51) Int. Cl.
*F16H 61/30* (2006.01)
*F16H 61/06* (2006.01)
(Continued)

(52) U.S. Cl.
CPC ............. *F16H 61/30* (2013.01); *F16H 61/06* (2013.01); *F16H 61/2807* (2013.01);
(Continued)

(58) Field of Classification Search
CPC ...... F16H 61/30; F16H 61/06; F16H 61/2807; F16H 2061/0455; F16H 2061/2823; F16H 2061/302
(Continued)

(56) References Cited

U.S. PATENT DOCUMENTS

| 4,395,925 A | 8/1983 | Gaus |
| 4,683,776 A | 8/1987 | Klemen |

(Continued)

FOREIGN PATENT DOCUMENTS

| DE | 29 36 969 A1 | 4/1981 |
| DE | 42 38 025 A1 | 5/1994 |

(Continued)

OTHER PUBLICATIONS

German Search Report issued in corresponding German Application No. 10 2021 200 165.3 (dated Sep. 24, 2021).

*Primary Examiner* — Ha Dinh Ho
(74) *Attorney, Agent, or Firm* — FINCH & MALONEY, PLLC

(57) ABSTRACT

Disclosed is a method for operating a multi-gear vehicle transmission having a plurality of shifting elements (A, B, C, D, E) for engaging the gears of the vehicle transmission, where, in a neutral gear an input (AN) and an output (AB) of the vehicle transmission are decoupled from one another, and where, in a driving gear the input (AN) and the output (AB) of the vehicle transmission are coupled to one another in order to propel the vehicle, by closing at least one shifting element (B). When the neutral gear is engaged, at least an actuation condition of a vehicle brake (11) and a transmission condition with elevated drag losses are detected, where, when the neutral gear is engaged, the shifting element (B) for the driving gear is vented if it is recognized that the vehicle brake (11) has been released and the transmission condition with elevated drag losses pertains.

18 Claims, 1 Drawing Sheet

(51) Int. Cl.
*F16H 61/28* (2006.01)
*F16H 61/04* (2006.01)

(52) U.S. Cl.
CPC ............ *F16H 2061/0455* (2013.01); *F16H 2061/2823* (2013.01); *F16H 2061/302* (2013.01)

(58) Field of Classification Search
USPC ........................................................ 74/335
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,634,980 B1 | 10/2003 | Ziemer | |
| 6,648,790 B2 * | 11/2003 | Raghavan | F16H 3/66 |
| | | | 475/296 |
| 6,723,018 B2 * | 4/2004 | Hayabuchi | F16H 3/666 |
| | | | 475/276 |
| 6,736,749 B2 * | 5/2004 | Bucknor | F16H 3/66 |
| | | | 475/275 |
| 6,960,149 B2 | 11/2005 | Ziemer | |
| 7,018,319 B2 | 3/2006 | Ziemer | |
| 7,699,736 B2 | 4/2010 | Diosi et al. | |
| 7,736,264 B2 | 6/2010 | Moorman et al. | |
| 7,789,792 B2 | 9/2010 | Kamm et al. | |
| 2002/0119859 A1 | 8/2002 | Raghavan et al. | |
| 2004/0082428 A1 * | 4/2004 | Benedict Usoro | F16H 3/666 |
| | | | 475/296 |
| 2008/0015080 A1 * | 1/2008 | Kamm | F16H 3/666 |
| | | | 475/275 |
| 2008/0227587 A1 | 9/2008 | Carey et al. | |
| 2008/0234093 A1 | 9/2008 | Diosi et al. | |

FOREIGN PATENT DOCUMENTS

| | | |
|---|---|---|
| DE | 199 49 507 A1 | 4/2001 |
| DE | 101 48 424 A1 | 7/2002 |
| DE | 101 15 983 A1 | 10/2002 |
| DE | 101 15 995 A1 | 10/2002 |
| DE | 102 13 820 A1 | 10/2002 |
| DE | 103 15 709 A1 | 10/2004 |
| DE | 10 2005 002 337 A1 | 1/2005 |

* cited by examiner

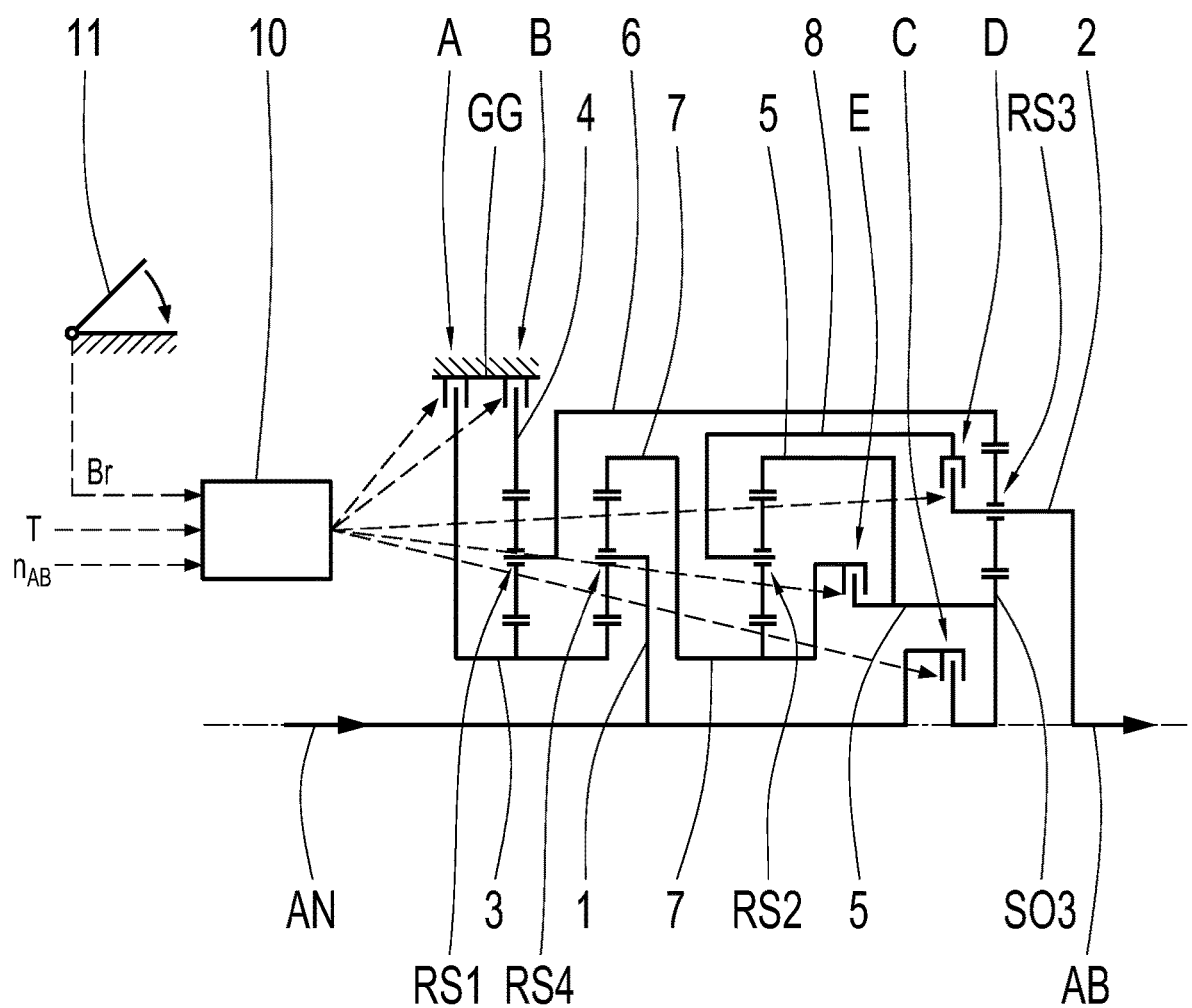

OPERATION OF A MULTI-SPEED VEHICLE TRANSMISSION

This application claims the benefit of and right of priority under 35 U.S.C. § 119 to German Patent Application No. 102021200165.3, filed on Jan. 11, 2021, the contents of which are incorporated herein by reference in its entirety.

FIELD OF THE DISCLOSURE

The invention relates to a method, a control unit, and a computer-readable memory medium for the operation of a multi-gear vehicle transmission.

BACKGROUND

Multi-gear transmissions are known in automotive technology and are widely used. The gears, also referred to as steps or gear ratio steps, provide different gear ratios of the transmission between a transmission input and a transmission output. The gears can be engaged as desired. In that way a torque delivered by a drive motor of the vehicle can be transformed to suit the situation. For example, in a starting gear a high gear ratio can be provided in order to accelerate the vehicle. In another driving gear a lower gear ratio can then be provided in order to maintain the speed of the vehicle in a fuel-consumption-favoring manner. The individual gears are engaged by means of shifting elements.

BRIEF DESCRIPTION OF THE DRAWINGS

FIG. 1 illustrates shows a schematic representation of the arrangement of shafts, planetary gearsets, and shifting elements of a multi-gear vehicle transmission of planetary design, in accordance with an embodiment of the present disclosure.

DETAILED DESCRIPTION

Preferred examples of multi-gear transmission can be seen in DE 10 2005 002 337 A1.

In a neutral gear of the vehicle transmission, also called the idling gear, the transmission input and at least the transmission output used for driving are decoupled from one another. To engage the neutral gear, a sufficiently large number of shifting elements of the transmission are opened. In the neutral gear the vehicle can be pushed or towed. Likewise, in the neutral gear internal drag losses of the transmission can be minimized. Thus, engaging the neutral gear can be advantageous, for example during short stops of the vehicle in which the drive motor of the vehicle is still running. The engagement of the neutral gear can be called for by a user of the vehicle, or automatically.

When the neutral gear is engaged, in practice it is desirable that a gearshift into one of the driving gears of the transmission, in particular the starting gear used for starting off, should be as quick and comfortable as possible. To prepare for that gearshift, the so-termed air gap of at least one of the shifting elements for the starting gear can be selectively reduced.

In the case of a shifting element of the transmission actuated by a pressure medium, this preparation takes place in that the actuating piston of the shifting element is pre-filled with pressure medium. During this a certain quantity of the pressure medium is already fed into the actuating piston. That quantity is calculated to be such that the shifting element does not yet close. The closing process can then be initiated by feeding more of the pressure medium into and/or increasing the pressure in the actuating piston. In particular, during the pre-filling the shifting element is brought (nearly) up to the so-termed touch-point of the shifting element.

The quantity of pressure medium required for pre-filling depends on many factors. These are in particular the component tolerances and the current wear condition of the shifting element concerned, and the current friction situation in the transmission. Sufficiently accurate sensors for the exact determination of the necessary pre-filling and the pre-filling already present are not normally provided in vehicle transmissions. Too much pre-filling can bring about undesired (partial) closing of the shifting element. This can result in inadvertent rolling-off of the vehicle in the neutral gear. Too little pre-filling can bring about delayed and/or uncomfortable closing of the shifting element when shifting out of the neutral gear to a driving gear.

The purpose of the present invention is to operate a multi-gear vehicle transmission in a reliable manner.

This objective is achieved in each case by the features specified in the independent claims. Preferred embodiments thereof can be seen in the dependent claims.

According to these, the invention starts from a multi-gear vehicle transmission which comprises a plurality of shifting elements for engaging the gears of the vehicle transmission. The transmission has at least one neutral gear and a driving gear. In the neutral gear an input and an output of the transmission are decoupled from one another. Thus, the neutral gear corresponds to idling of the transmission. In contrast, in the driving gear the input and the output are coupled in order to propel the vehicle. The coupling is produced by closing at least one of the shifting elements of the transmission. Thus, the gearshift from neutral into the driving gear takes place by closing at least the said shifting element. In particular the shifting element can be actuated by a pressure medium, for example hydraulically or pneumatically.

It is now provided that when the neutral gear is engaged, at least an actuation condition of a vehicle brake and a transmission condition in which drag losses in the vehicle transmission are elevated, are recognized. In particular, the actuation conditions "vehicle brake released" (the vehicle can roll away) and "vehicle brake actuated" (the vehicle is braked) are differentiated from one another.

Furthermore, it is now provided that when the neutral gear is engaged, the said shifting element provided for the driving gear is vented when it is recognized that:
 a) the vehicle brake is released, and
 b) the transmission condition is such that drag losses are elevated.

By venting the shifting element, the said shifting element is brought reliably to the open condition. The preparation of the shifting element for the gearshift into the driving gear—if it has already taken place—is reversed. In particular, the air gap of the shifting element reduced by the preparation is restored. If during the said preparation the shifting element has been prestressed, the prestressing is reduced in a controlled manner. If the shifting element can be actuated by a pressure medium and during the said preparation it has been pre-filled, the pre-filling is discharged. Thus, it is not necessary for the shifting element actually to be filled with air during the venting.

In particular, the shifting element that can be actuated by a pressure medium is depressurized, i.e. brought down to the ambient pressure. In particular, for this a pressure connection is established between the actuation piston of the shifting element and a pressure medium reservoir. This is done in particular by means of one or more valves of the vehicle transmission. The pressure medium reservoir is at ambient pressure; that is, usually at the air pressure in the immediate surroundings of the vehicle transmission. By virtue of the pressure connection established, the actuation piston is then also substantially at the pressure of the surroundings.

Later, with the neutral gear engaged, the shifting element can be prepared (again) for the gearshift without risk, i.e. pre-filled or prestressed. In particular that takes place as soon as the vehicle brake is actuated again and/or as soon as the transmission condition is no longer such that drag losses are elevated. In that way, later, quick and comfortable starting in the driving gear can still take place.

Accordingly, in the present case the pre-filled or pre-stressed condition of the shifting element on the one hand and its closed condition on the other hand can be differentiated. In the pre-filled or prestressed condition, the shifting element does not transmit any (appreciable) force or torque, whereas in the closed condition the shifting element transmits a force or torque.

The invention is based on the recognition that when the neutral gear is engaged, there is in any case no risk that the vehicle will start off so long as the vehicle brake is actuated. Only after the vehicle brake has been released could the pre-filling or prestressing of the shifting element result in unwanted starting. In addition, it has been recognized that unwanted starting while the neutral gear is engaged, and the service brake is released, could also only occur in practice when there are elevated drag losses in the transmission. In that condition of the transmission, compared with a normal, hot-running operating condition elevated drag loses occur in the transmission.

The transmission condition in which there are elevated drag losses occurs in particular when the vehicle transmission has not yet reached a sufficiently high temperature. When the transmission is cool, the lubricant in it (usually transmission oil) has relatively high viscosity. Component frictions and splashing losses in the transmission are correspondingly high. A shifting element that is correctly pre-filled or prestressed under normal operating conditions can still inadvertently transmit a torque in such circumstances. This transmission condition is therefore in particular equivalent to a "cold" vehicle transmission. Such a transmission condition may pertain, for example, if the temperature of the transmission lubricant falls below a certain temperature, in particular 40° C. That can be determined, for example, by a temperature sensor in the vehicle transmission.

As already explained above, the vehicle transmission is a multi-gear vehicle transmission comprising a plurality of shifting elements for the engagement of the gears of the vehicle transmission. The shifting elements can be called transmission shifting elements and can be in the form of clutches and/or brakes. At least the one shifting element for the driving gear can be designed to be actuated by a pressure medium. Preferably, all the shifting elements for the driving gears of the transmission are actuated in that way. In particular, as the pressure medium the lubricant of the vehicle transmission is used. Preferably, the shifting element or shifting elements is/are frictionally operating shifting elements, in particular in each case a disk clutch or disk brake. The vehicle transmission is in particular an automatic transmission of planetary design.

Control of the actuation of the shifting elements is achieved by the also proposed transmission control unit. The transmission control unit thus actuates the shifting elements as the situation demands.

Preferably, the vehicle transmission is a transmission designed in accordance with DE 10 2005 002 337 A1. For more details of those transmissions explicit reference is made to the disclosure in that document. Particularly preferably, the vehicle transmission is designed in accordance with FIG. 4 thereof. The shifting elements therein are denoted A, B, C, D, E. The vehicle transmission can be designed for use in a vehicle, in particular for use in a passenger car, a truck or a powered omnibus. However, the vehicle transmission can also be designed for use in a rail vehicle, an agricultural vehicle or in other vehicles.

A driving gear is understood to be the gear or those gear(s) of the vehicle transmission which is/are provided for propelling the vehicle, i.e. forward gears and (if present) reversing gears. In such a case the transmission input and the transmission output of the vehicle transmission are coupled to one another by at least one of the shifting elements. In contrast, in the neutral gear of the vehicle transmission it is provided that the transmission input and the transmission output are decoupled from one another. Thus, in the neutral gear the vehicle cannot be propelled by way of the vehicle transmission.

Preferably the said shifting element, which is vented under the conditions a) and b) mentioned above, serves for the engagement of a starting gear for driving off in the vehicle. In other words, the driving gear claimed is the starting gear. Compared with other gears of the vehicle transmission, such a starting gear is in particular, a gear with a high gear ratio. Thus, in particular, other gears of the vehicle transmission have lower gear ratios. Such a starting gear is in particular the first gear. The starting gear can vary, depending on the situation. If the load on the vehicle is low, for example, the second or third gear can be chosen as the starting gear. It is also possible, depending on the situation, for a reversing gear to be chosen as the starting gear. In the neutral gear the shifting element respectively associated with the chosen starting gear can then be pre-filled or prestressed in order to prepare for the gearshift into the starting gear. That shifting element is vented if the above-mentioned conditions a) and b) are fulfilled.

Preferably, the operation of the vehicle transmission is monitored continually or at regular intervals. For this it is in particular determined whether the neutral gear is engaged, whether the vehicle brake has been released, whether the transmission condition is such that drag losses are elevated, and whether the vehicle is in a rolling condition. To do that, in particular sensor information from sensors of the vehicle and the vehicle transmission is evaluated, which information would be indicative of the said conditions.

In particular, it is determined whether the neutral gear is actually engaged. That can be done in any desired way. For example, it can be done with reference to actuation signals for valves of the vehicle transmission for actuating the shifting elements. Alternatively, or in addition, it can be done with reference to pressure signals from one or more pressure sensors of the vehicle transmission for the pressure medium. Alternatively, or in addition, it can be done with reference to rotation speed signals from one or more rotation speed sensors of the vehicle transmission. Further determination method not explicitly mentioned here can likewise be used. This determination is in particular also carried out for other purposes, in particular for the correct control of the transmission by the transmission control unit and/or for displaying the currently engaged gear on a screen inside the vehicle.

The determination of whether the transmission condition is present with elevated drag losses can also be carried out in any way desired. As described above, this is done in particular with reference to a transmission temperature, in particular a temperature of the transmission lubricant (oil temperature). For that purpose, a temperature sensor is preferably provided on the vehicle transmission. Alternatively, or in addition, it can be done with reference to a temperature model of the vehicle transmission. Alternatively, or in addition, it can be done with reference to a time that has elapsed since the starting of a drive motor of the vehicle that is or can be coupled to the vehicle transmission. Further determination methods not explicitly mentioned here can also be used. Preferably, the transmission temperature determined or the time elapsed is compared with a threshold value. If the transmission temperature or the time elapsed is below the threshold value, it is assumed that the transmission is in a condition with elevated drag losses. If the transmission temperature or the time elapsed is above the threshold value, it is assumed that the transmission is not in a condition with elevated drag losses. The transmission is in that case running hot, so that the drag losses in the transmission are sufficiently reduced. The threshold value for the temperature is preferably between 30° C. and 50° C. A particularly suitable threshold value for the temperature is between 35° C. and 45° C., in particular around 40° C.

The determination of whether the vehicle brake has been released can also be carried out in any way desired. When the vehicle brake is released, no deceleration or braking force is called for by the brake. The vehicle brake is in particular a service brake of the vehicle, in particular a vehicle braking system with disk or drum brakes. In particular, this is done with reference to a braking signal. This braking signal can represent the deceleration or braking force called for by an operator or system of the vehicle. The braking signal can be indicated by a position sensor attached to a brake pedal or brake lever of the vehicle. The brake pedal and brake lever serve respectively to enable the operator of the vehicle to specify the deceleration or braking force desired. Alternatively, or in addition, this can be done with reference to a brake pressure present in the brake system. For example, if the brake signal or brake pressure is below a certain threshold or is absent, the vehicle brake has been released. Further determination methods not explicitly mentioned here can also be used.

Preferably, when the neutral gear is engaged and the vehicle brake is actuated, the shifting element for engaging the driving gear is at least prestressed or pre-filled with pressure medium. As already explained earlier, in that way the shifting element in the neutral gear is already prepared for the gearshift to the driving gear. Thus, the shift from the neutral gear to the driving gear can be carried out quickly and comfortably. As also explained earlier, however, the shifting element is vented for the sake of safety if the two said conditions a) and b) are fulfilled.

Preferably the vehicle transmission is designed such that in the driving gear, at least two shifting elements of the vehicle transmission are closed. In other words, at least those two shifting elements must be closed for the driving gear to be engaged. In this case, when the neutral gear is engaged the first of those shifting elements is vented if it is recognized that:
a) the vehicle brake has been released, and
b) the vehicle transmission is in the condition with elevated drag losses.

Thus, this corresponds to the above-mentioned conditions a) and b). So, the first shifting element is brought to its reliably open condition in a controlled manner. In that way, in a first safety-related step the vehicle is prevented from starting off despite the fact that the neutral gear is engaged.

In contrast, when the neutral gear is engaged the second of the said shifting elements is vented if it is recognized that:
a) the vehicle brake has been released, and
b) the transmission condition is such that drag losses are elevated, and
c) the vehicle is in a rolling condition. In this rolling condition the vehicle is moving ahead.

Thus, the second shifting element is not vented until, besides the above-mentioned conditions a) and b), the additional condition c) is fulfilled. This condition c) pertains if despite the already vented first shifting element the vehicle starts moving (rolling condition). Then for the sake of safety the second shifting element also is vented. Accordingly, the second shifting element also is brought to its securely open condition in a controlled manner. In that way there is a second safety step to prevent the vehicle moving off even though the neutral gear is engaged.

The determination of whether the vehicle is rolling can be done in any desired way. In particular, this is done with reference to a drive output rotation speed of the vehicle transmission, i.e. a rotation speed at the transmission output. For that, a rotation speed sensor can be provided on the transmission output. This rotation speed sensor is usually already present for other purposes. Alternatively, or in addition, it can be done with reference to a wheel rotation speed of the vehicle. For this, for example rotation speed sensors of an anti-blocking system of the vehicle can be used. Alternatively, or in addition, it can be done with reference to an acceleration of the vehicle. In that case, for example, an acceleration sensor of the vehicle can be used. For example, if the rotation speed or the acceleration exceeds a certain threshold value, the vehicle is in a rolling condition. Further determination methods not explicitly mentioned here can also be used.

Preferably, when the neutral gear is engaged, and the vehicle brake is actuated:
the first of the two shifting elements for engaging the driving gear is prestressed or pre-filled with pressure medium, and
the second of the two shifting elements for engaging the driving gear is closed.

Thus, for the gearshift into the driving gear both shifting elements are prepared. In that way the gearshift from the neutral to the driving gear can be carried out particularly quickly and comfortably. When the above-mentioned conditions a) and b) are fulfilled, only the first shifting element is vented in order to make sure that it is open. If in addition the above-mentioned condition c) is fulfilled, the second shifting element also is vented in order to make sure that it is open. As already explained, the driving gear is in particular a starting gear. Accordingly, in such a transmission at least or exactly two shifting elements have to be closed to engage the starting gear.

Preferably the vehicle transmission is designed such that in the driving gear at least or exactly three shifting elements of the vehicle transmission are closed. In other words, at least or exactly these three shifting elements have to be closed in order to engage the driving gear. When the neutral gear is engaged, and the vehicle brake is actuated:
the first of these shifting elements is prestressed or pre-filled with pressure medium, and
the second of the shifting elements is closed, and
the third of the shifting elements is vented.

Thus, all three shifting elements are prepared for the gearshift into the driving gear. In vehicle transmissions designed in such a manner this procedure has been found particularly suitable for shifting quickly and comfortably out of the neutral gear into the driving gear. When the above-mentioned conditions a) and b) are fulfilled, here too only the first shifting element is vented in order to ensure that it is open. If the above-mentioned condition c) is also fulfilled, then the second shifting element also is vented in order to ensure that it is open. Since the third shifting element has already been vented and is therefore definitely open, no further measures are needed. As already explained, the driving gear is in particular a starting gear. Accordingly, in such a transmission at least or exactly these three shifting elements have to be closed in order to engage the starting gear.

Preferably, in the vehicle transmission at least or exactly three shifting elements are closed in any of the driving gears. Such transmissions have been found to be comfortable and favorable from the standpoint of fuel consumption. DE 10 2005 002 337 A1 shows preferred variants of such transmissions.

In the case of a particularly preferred procedure for actuating the multi-gear vehicle transmission, the following steps are provided, in the sequence described:

1. The neutral gear of the vehicle transmission is engaged, for example automatically or as requested by a user. For this, one or more of the shifting elements of the vehicle transmission are opened.
2. Then, with the neutral gear engaged, if the vehicle brake is or will be actuated, at least one shifting element actuated by a pressure medium is at least pre-filled in order to engage the starting gear. This shifting element is to be closed when shifting to the starting gear. If two shifting elements actuated by pressure medium are to be closed for the engagement of the starting gear, the first of the shifting elements can be pre-filled and the second of the shifting elements can now already be closed. If three shifting elements actuated by pressure medium are to be closed for the engagement of the starting gear, then the first of the shifting elements can be pre-filled and the second of the shifting elements can now already be closed and the third of the shifting elements can be vented.
3. If with the neutral gear engaged the vehicle brake is then released and the transmission is in its condition with elevated drag losses, the pre-filled (first) shifting element is vented.
4. If then the vehicle is in a rolling condition, in addition the closed (second) shifting element is vented.

The proposed method is controlled by the also proposed transmission control unit. This means that the method is carried out by way of the transmission control unit. Accordingly, the proposed transmission control unit is specially designed so that it carries out the method with the respective steps indicated. For this, the transmission control unit has in particular an input, an output, and a calculation means. The transmission control unit also comprises for this, in particular, a memory (data store) in which the special commands for carrying out the method are stored. The input of the transmission control unit is designed so that through it the necessary information can be supplied to the transmission control unit, for example the current transmission temperature, the current drive output rotation speed, and/or the current brake signal. The output of the transmission control unit is designed so that through it the necessary control signals for actuating the shifting elements can be emitted, for example signals for opening and closing valves of the shifting elements. The calculation means carries out the commands stored in the memory, whereby the incoming information is processed and the corresponding control signals for the shifting elements are emitted. The calculation means consist, in particular, of a microprocessor.

A computer-readable storage medium is also proposed. The storage medium contains commands which, when carried out by a computer, cause the computer to carry out the method. Thus, when the stored commands are carried out by the transmission control unit the latter is able to carry out the proposed method.

Below, the invention is explained in greater detail with reference to a figure (FIG. 1), from which preferred embodiments of the invention emerge.

FIG. 1 shows a schematic representation of the arrangement of shafts AN, AB, 1, 2, 3, 4, 5, 6, 7, 8 and planetary gearsets RS1, RS2, RS3, RS4 and shifting elements A, B, C, D, E of a preferred multi-gear vehicle transmission of planetary design. To assist better understanding only the upper half of the vehicle transmission is shown. The lower half is in particular constructed as a mirror image of the upper half. The structure and function of the vehicle transmission in FIG. 1 corresponds to those of FIG. 4 in DE 10 2005 002 337 A1. Thus, for more details reference should be made expressly to the related explanations in that document.

The drive input shaft AN is usually coupled to the drive motor of the vehicle or can be coupled thereto by means of a separate clutch, in particular such as a hydrodynamic torque converter. The drive output shaft AB usually is or can be coupled to drive wheels of the vehicle.

FIG. 1 also shows the transmission control unit 10 which serves to actuate the shifting elements A, B, C, D, E of the transmission. Thus, the control unit enables the shifting elements A, B, C, D, E to be opened and closed as desired. In that way, according to the situation at the time the gear that is suitable or called for by a vehicle operator is engaged. For this, appropriate information is sent to the control unit 10 by way of the control unit input. The control unit processes that information and, by way of the control unit output, emits corresponding signals for actuating the shifting elements A, B, C, D, E.

In particular, the information Br, T, and $n_{AB}$ is sent to the control unit 10. The information Br is a brake signal of the service brake of the vehicle, which represents an actuation condition of the brake. Of the service brake, only the brake pedal 11 is shown in FIG. 1. Br is determined, for example, by a position sensor of the brake pedal 11. The information T is a temperature signal which represents the transmission temperature. T is determined, for example, by a temperature sensor of the transmission. The information $n_{AB}$ is a rotation speed signal which represents the rotation speed at the drive output shaft AB.

The shifting elements A, B, C, D, E are usually actuated by a pressure medium. For this, every shifting element A, B, C, D, E has associated with it an actuating piston which can be acted upon individually by the pressure of a pressure medium. For this, the control unit 10 actuates the valves associated with the actuating piston. In the transmission shown in FIG. 1 the pressure medium is usually the lubricant of the transmission (transmission oil).

The transmission can be shifted to a neutral gear, in which the drive input shaft AN is decoupled from the drive output shaft AB. For this a sufficient number of the shifting elements A, B, C, D, E are opened, in particular the shifting elements B, C, D, E. The driving gears of the transmission serve to propel the vehicle. Thus, eight forward gears and one reversing gear are available as driving gears. In the transmission shown in FIG. 1, in the driving gears three of the five shifting elements A, B, C, D, E are always closed and the other two shifting elements A, B, C, D, E are open.

With the starting gear the vehicle is accelerated from a standstill or from very low speeds. Thus, the starting gear has a relatively high gear ratio. Depending on the loading condition and the desired travel direction, the gears suitable for starting are in particular the first gear (shifting elements A, B, C closed and D, E open), or the second gear (shifting elements A, B, E closed and C, D open), or the reversing gear (shifting elements A, B, D closed and C, E open).

Below, a preferred procedure for operating a transmission with its neutral gear engaged is explained, taking the transmission shown in FIG. 1 as an example. This procedure can also be used with other vehicle transmissions. The procedure is carried out by the transmission control unit 10, which is specially designed for the purpose. As already described above, the engagement of the neutral gear is for example called for by the vehicle operator or an automatic system. For the neutral gear, at least the shifting elements B, C, D, E are opened. In this example the first gear serves as the starting gear. For this, the shifting elements A, B, C have to be closed and the shifting elements D, E open.

It is determined whether the service brake of the vehicle has been released. In particular, this is done when the transmission control unit 10 receives and evaluates the brake signal Br from the vehicle brake system.

It is also determined whether the transmission is in a condition with elevated drag losses. In particular, this is done by the control unit 10, by comparing the current temperature T of the transmission with a threshold value. For example, the threshold value is 40° C. If the temperature T determined is lower, the transmission is still relatively cool and the transmission lubricant correspondingly has a high viscosity. Consequently, the drag losses in the transmission can be assumed to be relatively high, so the transmission condition of having elevated drag losses pertains. If the temperature T determined is higher, the transmission is hot enough and the viscosity of the lubricant is therefore low. Consequently, the drag losses in the transmission can be assumed to be relatively low, so the transmission condition of having elevated drag losses does not pertain. As described earlier, whether or not this transmission condition pertains can also be determined in other ways.

It is also determined whether the vehicle is in a rolling condition. In other words, it is checked whether, with its neutral gear engaged, the vehicle has started moving. For this it is in particular determined whether the rotation speed $n_{AB}$ at the drive output shaft AB is greater than zero ($n_{AB}>0$).

When the service brake has not been released (i.e. it is still actuated), the vehicle is prevented from starting by the service brake. The transmission can therefore be prepared for the gearshift into the starting gear while the neutral gear is engaged. This enables a quick and comfortable subsequent gearshift into the starting gear. For that, the shifting element A is closed and the shifting element B is pre-filled. The shifting element C is or remains vented. Thus, the shifting elements B, C are open. The shifting elements D, E are also open.

If the service brake has been released while the neutral gear is engaged, in principle the vehicle could begin moving since it is no longer secured against starting off. If in that case the condition with high drag losses does not pertain, the above-mentioned preparation for the gearshift to the starting gear can be carried out or maintained despite the released brake. Despite the released brake and engaged neutral gear, there is no increased risk that the vehicle will start rolling. However, if the condition with high drag losses does pertain, for the sake of safety the shifting element B is vented. If the shifting element B has already been pre-filled, the pre-filling is discharged and the shifting element B is brought to its securely open condition. In that way, in a first safety step undesired starting off in the neutral gear is prevented.

If despite the venting of the shifting element B the rolling condition is detected, the shifting element A too is vented. Thus, the shifting element A too is brought to its securely open condition. In that way, in a second safety step any further undesired starting in the neutral gear is prevented.

As soon as it is subsequently found that with the neutral gear engaged the service brake has been actuated again, the above-mentioned preparation for the gearshift into the starting gear can (again) be carried out.

INDEXES

1 Shaft
2 Shaft
3 Shaft
4 Shaft
5 Shaft
6 Shaft
7 Shaft
8 Shaft
10 Transmission control unit
11 Brake pedal
100 Step
200 Step
300 Step
400 Step
500 Step
600 Step
700 Step
A Shifting element
B Shifting element
C Shifting element
D Shifting element
E Shifting element
AN Drive input shaft
AB Drive output shaft
GG Housing
RS1 Planetary gearset
RS2 Planetary gearset
RS3 Planetary gearset
SO3 Sun gear

The invention claimed is:

1. A method for operating a multi-gear vehicle transmission having an input, an output, and a plurality of shifting elements for engaging the gears of the vehicle transmission, the method comprising:
   decoupling the input from the output to place the vehicle transmission in a neutral gear;
   coupling the input to the output by closing at least one shifting element to place the vehicle transmission in a driving gear and to propel the vehicle;
   detecting, when the vehicle transmission is in the neutral gear, an actuation condition of a vehicle brake and drag losses of the vehicle transmission; and
   venting, when the vehicle transmission is in the neutral gear, the at least one shifting element for the driving gear if the actuation condition of the vehicle brake is a released condition and if the drag losses are elevated.

2. The method of claim 1, wherein detecting the drag losses of the vehicle transmission comprises taking into account one or more of (i) a lubricant temperature of the vehicle transmission, (ii) an operation duration of the vehicle transmission since a motor start of a drive motor that is or can be coupled to the vehicle transmission, and (iii) a temperature model of the vehicle transmission.

3. The method of claim 1, comprising prestressing or pre-filling with a pressure medium the shifting element for the driving gear when the vehicle transmission is in the neutral gear and the vehicle brake is actuated.

4. The method of claim 1 comprising:
closing at least two of the plurality of shifting elements of the vehicle transmission when the vehicle transmission is in the driving gear;
detecting a rolling condition of the vehicle; and
when the vehicle transmission is in the neutral gear,
venting the first of the said shifting elements if the actuation condition of the vehicle brake is the released condition and if the drag losses are elevated; and
venting the second of the said shifting elements if the actuation condition of the vehicle brake is a released condition, if the drag losses are elevated, and if the vehicle is rolling.

5. The method of claim 4, wherein detecting the rolling condition includes taking into account one or more of (i) a drive output rotation speed ($n_{AB}$) of the vehicle transmission, (ii) a wheel rotation speed of the vehicle, and (iii) an acceleration of the vehicle.

6. The method of claim 4, comprising, when the neutral gear is engaged and the vehicle brake has been actuated:
prestressing or pre-filling with a pressure medium the first of the shifting elements for the driving gear; and
closing the second of the shifting elements for the driving gear.

7. The method of claim 1, comprising:
closing, when the vehicle transmission is in the driving gear, at least three or exactly three of the shifting elements of the vehicle transmission;
prestressing or pre-filling with pressure a medium the first of the shifting elements when the neutral gear is engaged, the vehicle brake is actuated, and the second of the shifting elements is closed; and
venting the third of the shifting elements.

8. The method of claim 1, comprising closing at least three or exactly three shifting elements when placing the vehicle transmission in any of the driving gears.

9. A transmission control unit for the actuation of shifting elements of a vehicle transmission, wherein the transmission control unit is configured to carry out the method according to claim 1.

10. A computer-readable storage medium, containing commands which, when carried out by a computer, enable the method according to claim 1 to be carried out.

11. A multi-gear vehicle transmission comprising:
a plurality of shifting elements for engaging gears of the vehicle transmission;
an input and an output of the vehicle transmission, wherein, in a neutral gear the input and the output of the vehicle transmission are decoupled from one another, and wherein, in a driving gear the input and the output of the vehicle transmission are coupled to one another by closing at least one shifting element in order to propel the vehicle;
a control unit configured to detect, when the neutral gear is engaged, at least an actuation condition of a vehicle brake and a transmission condition of elevated drag losses,
wherein, when the neutral gear is engaged, the control unit is configured to vent the at least one shifting element for the driving gear if release of the vehicle brake is recognized and the transmission condition of elevated drag losses pertains.

12. The multi-gear vehicle transmission of claim 11, wherein detecting the drag losses of the vehicle transmission the control unit is configured to take into account one or more of (i) a lubricant temperature of the vehicle transmission, (ii) an operation duration of the vehicle transmission since a motor start of a drive motor that is or can be coupled to the vehicle transmission, and (iii) a temperature model of the vehicle transmission.

13. The multi-gear vehicle transmission of claim 11, wherein the control unit is configured to prestress or pre-fill with a pressure medium the at least one shifting element for the driving gear when the vehicle transmission is in the neutral gear and the vehicle brake is actuated.

14. The multi-gear vehicle transmission of claim 11, wherein the control unit is configured to:
close at least two of the plurality of shifting elements of the vehicle transmission when the vehicle transmission is in the driving gear;
detect a rolling condition of the vehicle; and
when the vehicle transmission is in the neutral gear,
vent the first of the said shifting elements if the actuation condition of the vehicle brake is the released condition and if the drag losses are elevated; and
vent the second of the said shifting elements if the actuation condition of the vehicle brake is a released condition, if the drag losses are elevated, and if the vehicle is rolling.

15. The multi-gear vehicle transmission of claim 14, wherein, when detecting the rolling condition, the control unit takes into account one or more of (i) a drive output rotation speed ($n_{AB}$) of the vehicle transmission, (ii) a wheel rotation speed of the vehicle, and (iii) an acceleration of the vehicle.

16. The multi-gear vehicle transmission of claim 14, wherein, when the neutral gear is engaged and the vehicle brake has been actuated, the control unit is configured to
prestress or pre-fill with a pressure medium the first of the shifting elements for the driving gear; and
close the second of the shifting elements for the driving gear.

17. The multi-gear vehicle transmission of claim 11, wherein the control unit is configured to:
close at least three or exactly three of the shifting elements of the vehicle transmission when the vehicle transmission is in the driving gear;
prestress or pre-fill with pressure a medium the first of the shifting elements when the neutral gear is engaged, the vehicle brake is actuated, and the second of the shifting elements is closed; and
vent the third of the shifting elements.

18. The multi-gear vehicle transmission of 11, wherein the control unit is configured to close at least three or exactly three shifting elements when placing the vehicle transmission in any of the driving gears.

* * * * *